July 9, 1946.    J. R. SNYDER ET AL    2,403,620
ALIGNING AND DETENT MEANS FOR QUICK DISCONNECT COUPLINGS
Filed Dec. 11, 1943    2 Sheets-Sheet 2
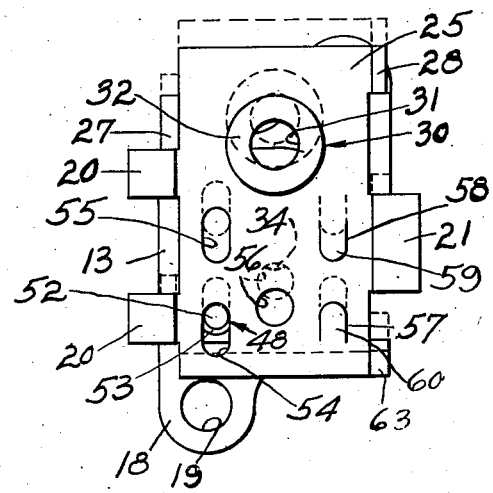
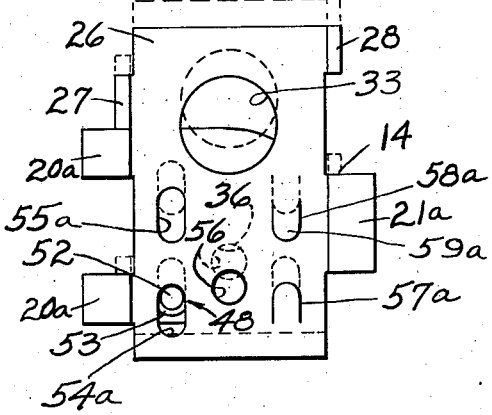
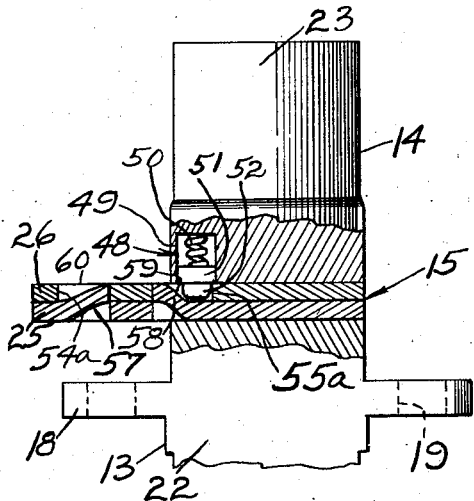
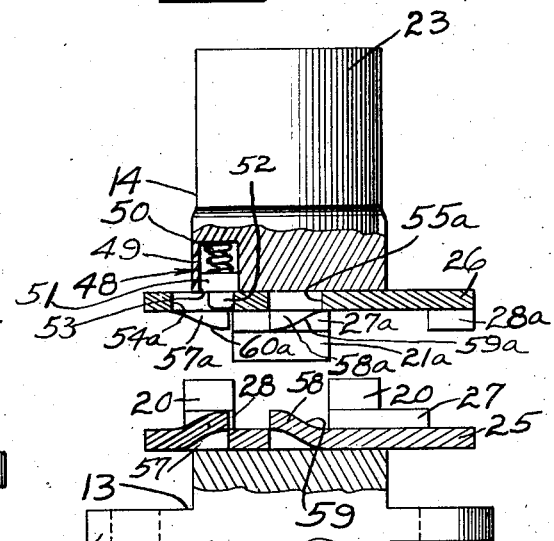
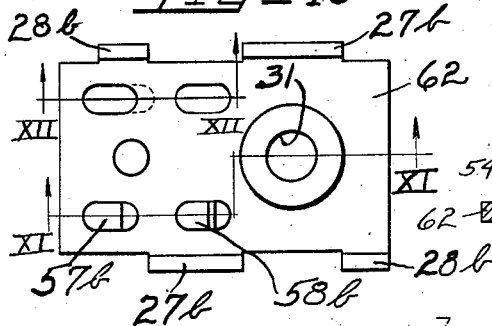
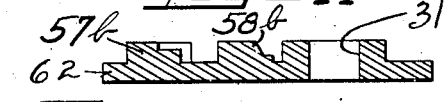
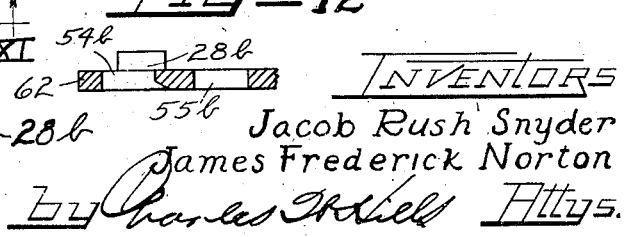
Inventors
Jacob Rush Snyder
James Frederick Norton Patented July 9, 1946

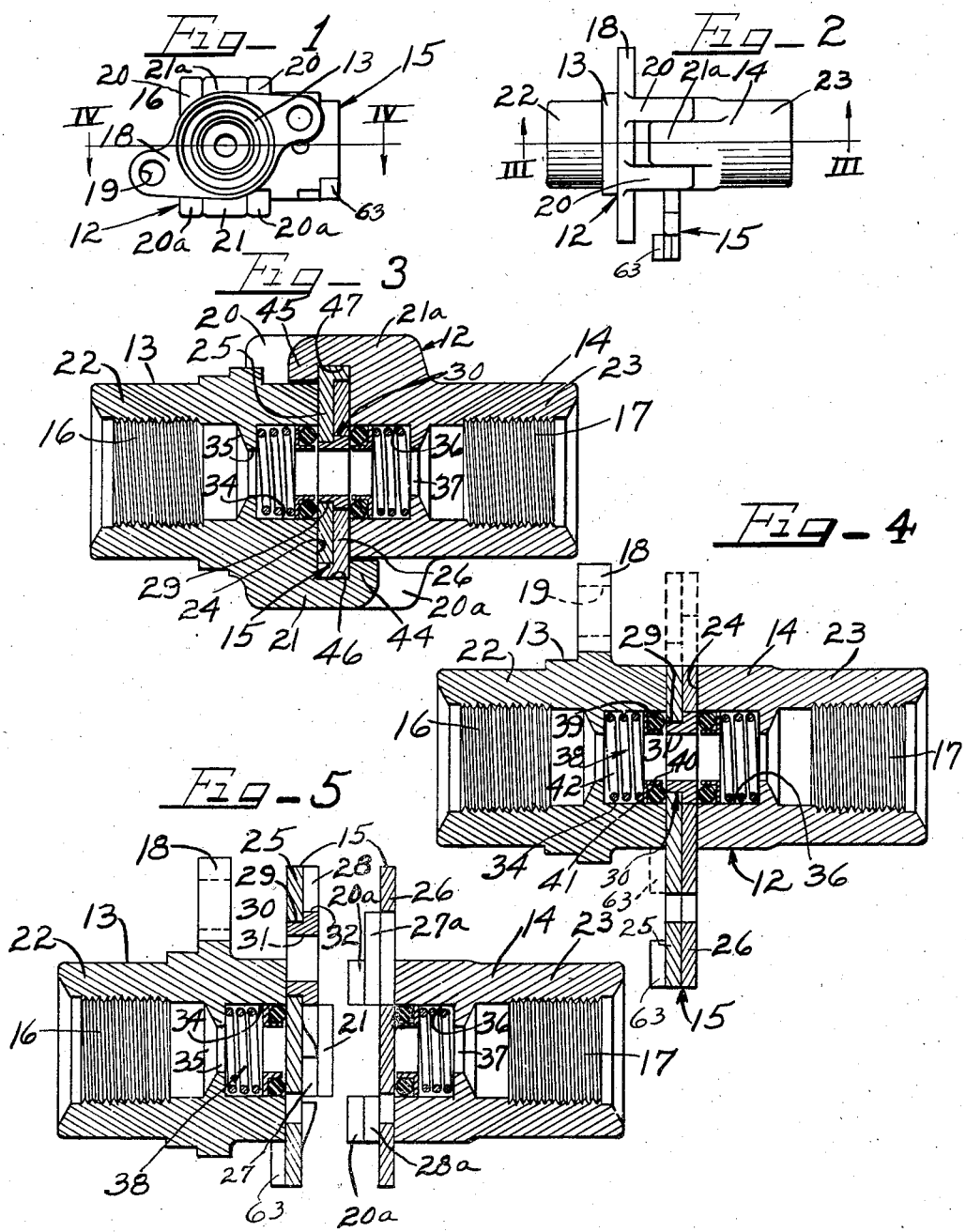

2,403,620

UNITED STATES PATENT OFFICE 2,403,620

ALIGNING AND DETENT MEANS FOR QUICK DISCONNECT COUPLINGS

Jacob Rush Snyder, Cleveland, and James Frederick Norton, Cleveland Heights, Ohio, assignors to Thompson Products, Inc., a corporation of Ohio Application December 11, 1943, Serial No. 513,900

11 Claims. (Cl. 284—4)

This invention relates to self-sealing couplings adapted for quick and easy operation while automatically sealing the coupling parts when said coupling parts are detached from each other.

More particularly, the present invention relates to improvements in aligning and detent means for the separable parts of a device for coupling together the ends of fluid conduits such, for example, as tubes, pipes, hoses and the like, to place the same in unrestricted communication when the parts are coupled together and to seal the ends thereof when uncoupled.

The present invention contemplates means which permit the elements of one of the parts of the coupling unit to be shifted relatively with respect to each other within certain limits to provide an opportunity for draining the coupling parts when disconnected. The means are also adapted to be employed as position finders when the parts of the coupling unit are coupled together for fluid flow communication.

A detachable coupling of the type with which the teaching of the present invention is particularly advantageously adapted to be employed embodies complementary parts or coupling boxes which are adapted to receive the ends of fluid conduits and to place them in unrestricted fluid flow communication. A shiftable valve member comprising a multiple number of parts is provided to detachably connect the coupling boxes and to control fluid flow between the fluid conduits connected to said boxes. One of the parts of the valve member is adapted to be retained in each of the coupling boxes for sealing the respective boxes when they are uncoupled to prevent leakage or drainage of the fluid out of the ends of the then separated fluid conduits.

The valve member may advantageously take the form of a shiftably mounted member made up of a pair of interfitting plates which are adapted to cooperate with a plurality of interlocking fingers on each of the coupling boxes to connect the coupling boxes together. One of the plates comprising the valve member is also adapted to be retained in each of the boxes when the coupling boxes are detached being shiftably supported by the locking fingers of its box.

According to the present invention, resilient detent means or the like are provided in at least one of the coupling boxes for engagement with a slotted opening in the valve plate associated with the box when the parts of the coupling unit are disconnected and permitting the shifting of the valve plate with respect to the box within limits imposed by the extremities of the slotted opening. Aligning means may advantageously be provided on each plate to cooperate with the slotted opening on the other of the plates for aligning the valve elements together when the coupling boxes are to be assembled in coupled relation and also to depress the detent means engaging the opening thereof to permit the valve member, when the plates are assembled in interfitting relation, to be shifted into engagement with the several locking fingers so as to couple the boxes together.

It is, thus, an object of the present invention to provide a detachable coupling unit having a multi-part separable valve member therein for placing the coupling boxes comprising the unit in fluid flow communication and sealing each coupling box of the unit when said unit is disconnected.

Another object of the present invention is to provide means associated with at least one of the boxes which coacts with that part of the valve member associated with said coupling box to provide for the shifting of said valve part with respect to its coupling box to a limited extent when the coupling is disconnected.

A further object of the present invention is to provide aligning means on each of the valve parts for registration with cooperating means on the other of the valve parts which will facilitate the assembly of the couplings.

It is a still further object of the present invention to provide resilient detent means for at least one of the coupling boxes which will cooperate with means on the valve plate associated therewith which are arranged to be disengaged therefrom by aligning means associated with the other of the valve parts when the coupling boxes of the unit are assembled in coupled relation.

Another important object of the present invention is to provide means associated with each coupling box which will permit the shifting of the valve part associated therewith with respect to its coupling box to an extent sufficient to permit said coupling box to be drained but insufficient to permit the valve parts to become disengaged from its coupling box when the coupling unit is disconnected.

Still other features and objects of the invention will be apparent as the detailed description of the annexed sheets of drawings which illustrate a preferred embodiment of the invention proceeds.

On the drawings:

Figure 1 illustrates an end elevation of a typical quick disconnect coupling with which the teaching of the present invention is particularly advantageously employed;

Figure 2 is a plan of the coupling of Figure 1 illustrating the coupling boxes in coupled relation;

Figure 3 represents a vertical cross-section through the coupling unit illustrated in Figure 2 taken along the line III—III therein;

Figure 4 represents a horizontal cross-section along the line IV—IV in Figure 1, with the coupling boxes of the coupling unit in assembled relation;

Figure 5 is a cross-section corresponding generally with that of Figure 4 but illustrating the coupling boxes of the coupling unit in disassembled relation and sealed off;

Figure 6 represents an end view of one of the coupling boxes with its associated valve part in sealed relation with respect thereto;

Figure 7 is an end view of the other of the coupling boxes with the parts in a relation which corresponds with that illustrated in Figure 6;

Figure 8 is a partial elevation of the assembled coupling unit of Figure 1 with parts broken away and in section to illustrate one of the operating positions of the aligning and detent means of the present invention;

Figure 9 corresponds generally to Figure 8 with the parts of the coupling unit in disassembled relation and illustrating another position of the aligning and detent means;

Figure 10 is a plan view of another form of valve plate for the valve member of a coupling unit which embodies the principles of the present invention;

Figure 11 is a vertical cross-section taken along the line XI—XI in Figure 10; and Figure 12 is a vertical cross-section taken along the line XII—XII in Figure 10.

As shown on the drawings:

In Figures 1 and 2, the quick disconnect coupling unit 12 which comprises a pair of coupling boxes 13 and 14, joined together in fluid flow communication by a shiftable or, more specifically, a slidable valve member 15 is particularly advantageous in that it demonstrates the application of the teachings of the present invention. The coupling unit 12 is adapted to interconnect a pair of fluid conduits (not shown) which may include pipes, tubes, hoses and the like, threaded or otherwise suitably secured in the ports 16 and 17 of the coupling boxes 13 and 14, respectively. The coupling unit 12 illustrated is generally of the type shown and described in the Jacob Rush Snyder copending application Serial No. 505,755 entitled "Quick disconnect coupling," filed October 11, 1943.

The coupling boxes 13 and 14 are preferably substantially identical in construction and design. The coupling box 13, however, is illustrated as differing from coupling box 14 by virtue of the provision thereon of a mounting flange 18. The mounting flange 18 is advantageously apertured as at 19 (Figure 1) for the reception of bolts or other suitable fastening means for securing the coupling box 13 of the unit 12 in an apparatus with which such a coupling unit may be advantageously employed.

The coupling boxes 13 and 14 are provided with a plurality of prong-like fingers 20, 21 and 20a, 21a, which are advantageously formed integrally with and arranged to project substantially radially from the generally cylindrical body portions 22 and 23 of said coupling boxes 13 and 14, respectively. As will be apparent from Figures 1 and 2 of the drawings, the several fingers 20, 21, 20a and 21a of the coupling boxes 13 and 14, respectively, cooperate to enclose all but two opposite sides of a generally rectangularly walled chamber 24 when the coupling boxes 13 and 14 are disposed in assembled relation (see Figure 3). It will be best understood from Figure 4 that the chamber 24 is preferably open ended to receive the valve member 15 in slidable relation therein.

The valve member 15 is preferably made up of a plurality of interfitting parts comprising, in the present instance, the plates 25 and 26. The plate 25 is provided with a plurality of flanged portions 27 and 28 which may advantageously be formed integrally with the body of said plates and disposed in alternately spaced relation along two of the opposite edges thereof. The plate 26 is provided with a plurality of flanged portions 27a and 28a which correspond in general to the flanged portions 27 and 28 of plate 25. The disposition of the flanged portions 27a and 28a on the plate 26 is such that they will cooperate with spaces provided between the several flanged portions 27 and 28 of the plate 25 thereby permitting the two plates to be mutually interfitted in the manner illustrated in Figures 3 and 9 of the drawings.

The plate 25 is provided with an aperture 29 extending therethrough and disposed substantially centrally of its lateral dimension but advantageously to one side of the mid-point of its longitudinal axis as will best be seen from Figure 6 of the drawings. In the aperture 29 in the plate 25 is press fit or otherwise suitably secured by brazing, soldering, welding or the like, an insert 30 defining a central passageway 31 extending therethrough. The insert 30 forms on the face of the plate 25 adjacent the mating face of the plate 26 an annular boss 32 which extends outwardly from the face of plate 25 to an extent equal to the lateral projection of the flanged portions 27 and 28 on said plate, as will be readily apparent from Figure 5 of the drawings. It will be understood that the insert 30 may also, if desired, be formed integrally with the plate 25.

The plate 26 of the valve member 15 has a circular aperture 33 arranged therein in the same manner as the aperture 29 in the plate 25. The aperture 33 is of a diameter sufficient to receive the annular boss 32 of the insert 30 therein. Thus, when the plates 25 and 26 of the valve member 15 are interfitted, the annular boss 32 of the insert 30 will register with the aperture 33 and the face of the boss will be flush with the outer face of the plate 26. It will be noted from Figures 4 and 8 of the drawings that when the plates 25 and 26 are assembled to form the valve member 15 they are so disposed that all of the peripheral edges of the plates will exactly coincide.

A chamber 34 which may advantageously be of generally cylindrical form is provided in the end of the body portion 22 of the coupling box 13 which is opposite to that in which the port 16 is formed and has an opening 35 extending from its base to the base of the port 16. A similar chamber 36 is formed in the body portion 23 of the coupling box 14 and communicates with the base of the port 17 therein by means of an opening 37. A sealing assembly 38 is disposed in each of the chambers 34 and 36 of the coupling boxes 13 and 14, respectively. The sealing assemblies 38 are adapted to be self-adjusting so as to prevent leakage of the fluid being handled by the coupling unit 12 between chambers 34 and 36 and the outer surfaces of the plates 25 and 26 as well as between the walls of said chambers and the plates both when the coupling boxes 13 and 14 are connected and when they are disconnected.

The several sealing assemblies 38 are identical and comprise in each case, as indicated in Figure 4, a generally annularly shaped sealing ring 39 internally of which is disposed the sleeve 40 having a flanged projection 41 which is adapted to overlie one face of the sealing ring 39. The flanged projection 41 forms a contacting surface for the compression coil spring 42 which is adapted to be positioned against the base of the chamber 34 or 36, so as to urge the sealing ring 39 against the outer face of the plates 25 or 26, whichever it may be depending on whether the chamber 34 or 36 is considered. Spring 42 operates to hold the sealing ring 39 in position both when the coupling boxes 13 and 14 are in connected and disconnected relation. The sealing ring 39 may advantageously be formed of any suitable plastic or sealing material such, for example, as cork, rubber, synthetic rubber, neoprene and other similar resilient or plastic material.

As previously explained, the rectangularly walled chamber 24 is formed by the cooperative relation of the coupling boxes 13 and 14 so arranged that the fingers 20, 21 and 20a, 21a of said boxes are disposed in interlocking relation, as evidenced by Figure 1 of the drawings. The prong-like fingers 20 and 21 of the coupling box 13 are so formed that they will extend across the overall thickness of the mated plates 25 and 26 of the valve member 15 so that the inwardly turned end portions 44 of the finger 21 will cooperate with the similar inwardly turned end portions of the fingers 20 to engage the outer or back surface of the plate 26 of the valve member 15. Similarly, the inwardly turned end portion 45 of the finger 21a and the like portions of the fingers 20a on the coupling box 14 will contact the back or outer surface of the plate 25 of the valve member 15 when the parts are in assembled relation (see Figure 3).

As will best be seen from Figures 3 and 9 of the drawings, the overall width of the flanged portion 27 and 28 of the plates 25 and the like portions 27a and 28a of the plate 26 corresponds to the base dimension of grooves 46 of the fingers 21, 21a as well as that of the grooves 47 of the fingers 20, 20a of the coupling boxes 13 and 14. Thus, when the coupling box 13 is detached from coupling box 14 of the coupling unit 12, as indicated in Figure 5 or 9 of the drawings, the valve plates 25 and 26 will, in each case, be retained in their associated coupling boxes.

Assisting in the maintenance of the valve member 15 and its constituent plates 25 and 26 in their properly disposed relation, both when the coupling boxes 13 and 14 are connected and when they are disconnected, are the spring urged retaining or detent means 48 associated with one or both of said boxes. In the illustrated coupling unit 12, a detent means 48 is disposed in a bore 49 formed in the face of each of the coupling boxes 13 and 14. The bore 49 in coupling box 13 is located to one side of the chamber 34 and adjacent one of the fingers 20. An identical bore 49 is provided in the coupling box 14.

The detent means 48, in each case, comprises a compression coil spring 50 extending into bore 49 and urging the generally cylindrical shell 51 outwardly. A substantially dome-shaped end portion 52 projects from one end of the shell 51 and forms an annular shoulder 53 where it joins the body portion of said shell.

The plate 25 of the valve member 15 which is operatively associated with the coupling box 13 for sealing off the same when the coupling unit 12 is disassembled has a pair of slotted openings 54 and 55 extending therethrough adjacent and parallel to one edge of said plate. When the valve member 15 has been shifted into a position in the coupling unit 12 so that the plates 25 and 26 will seal chambers 34 and 36 in coupling boxes 13 and 14, respectively, the boxes may then be detached from each other and the end portion 52 of the detent means 48 in coupling box 13 will register with slotted opening 54. The shell 51 urged outwardly by spring 50 is prevented from passing through the slotted opening 54 by contact of the annular shoulder 53 with the outer face of plate 25 of valve member 15 adjacent said opening 54.

By virtue of the fact that the opening 54 is slotted or elongated, the plate 25 may be shifted slightly with respect to the coupling box 13. The extent of such shiftable movement is defined by the contact of the end portion 52 with one end or the other of the opening 54. An aperture or bleed hole 56 is provided in plate 25 and disposed along the longitudinal center line of said plate in order that it may line up partially with chamber 34 when the plate 25 is in one of the extreme positions of its shiftable movement. This will permit the coupling box 13 to be drained when desired.

The shiftable movement of plate 25 with respect to coupling box 13 defined by the coaction of the detent means 48 and the opening 54 is sufficient to provide for drainage of the box but prevents the plate from being completely disengaged from fingers 20 and 21 of the box which would release the sealing assembly 38 in chamber 34 thereof. With plate 25 shifted in the box 13 so that the end portion 52 of the detent means 48 is in contact with the other extremity of the opening 54, the bleed hole 56 is closed and the chamber 34 in said box is sealed off. The sealed position of the elements of coupling box 13 is shown in full lines in Figure 6 while the drain position is represented by the dotted lines.

The plate 26 is provided with slotted openings 54a and 55a as well as a bleed hole 56 all of which are identical to their counterparts in the plate 25 and are arranged in identical relation therein. The general association and operation of the detent means 48 of the coupling box 14 with respect to opening 54a in plate 26 is the same as that described for the coupling box 13.

The plates 25 and 26 are each provided with a pair of aligning or cam means 57, 58 and 57a, 58a, respectively, which may take the form of bent up portions on the mating faces of the plates formed in a stamping operation. All of said cam means are disposed on their respective plates in such manner that when the coupling boxes 13 and 14 and their respective plates 25 and 26 for valve member 15 are placed together to be coupled, the cam means 57, 58 on plate 25 will register with openings 54a, 55a, respectively, on plate 26 while the cam means 57a, 58a on plate 26 will be disposed in the respective openings 54 and 55 on plate 25.

The registration of the cam means 57 and 57a with openings 54 and 54a just described will cause the shell 51 of each detent means 48 to be urged back into its bore 49 by the camming of the end portion 52 out of the opening 54 or 54a and supporting said end portions temporarily on said cam means. This operation enables the shifting of valve member 15 to interlock the boxes 13 and 14 for fluid flow communication between ports 16 and 17 thereof.

The cam means 58 and 58a on plates 25 and 26, respectively, with the mating of said plates, when boxes 13 and 14 are to be coupled, register, as we have seen, with openings 55a and 55, respectively. The aforementioned cam means do not, however, completely fill the openings into which they fit by virtue of the downwardly curving outer surfaces 59, 59a thereon (see Figures 8 and 9). These surfaces 59, 59a of cam means 58, 58a permit the end portions 52 of the respective detent means 48 to register with an end of the opening 55, 55a when the valve member is shifted to port uncovering position with ports 16, 17 and chambers 34, 36 of coupling boxes 13 and 14, respectively, in fluid flow communication and the boxes interlocked.

The registration of detent means 48 with the openings 55 and 55a in the manner described prevents the valve member from being shifted further in one of its directions of movement. In Figure 8, it will be noted that the valve member 15 may not be moved any further to the left by reason of the fact that end portion 52 of shell 51 is against the right hand extremity of opening 55a. The curved surface 59 of cam means 58 (or 59a of cam means 58a) will, however, aid in camming the end portion 52 out of the opening 55a (or 55) if the valve member is shifted to the right or to port covering position for disassembling the coupling boxes 13 and 14.

The surface 60 of cam means 57 (or 60a of cam means 57a) is also of arcuate form and enables the end portion 52 to contact the one extremity of the opening 54a (or 54) to prevent the valve member 15 from being shifted beyond the port covering position while the coupling boxes are disposed in adjacent relation.

It will be understood that the interrelation of the several openings 54, 55, 54a and 55a and the cam means 57, 58, 57a and 58a on plates 25 and 26 of valve member 15 aids materially in aligning the two coupling boxes 13 and 14 for assembling the coupling unit 12 for fluid flow communication. The shifting of valve member 15 laterally causes the flanged portions 27, 28 and 27a, 28a of plates 25 and 26, respectively, to engage with the interfitting fingers 20, 21, 20a and 21a of boxes 13 and 14 to lock said boxes together.

Supplementing the operation of one or more of the several detent means 48 and their cooperating slotted openings 54 and 54a of the valve plates 25 and 26, respectively, of the valve member 15 which coact when the plates are disposed in sealing position with respect to their coupling boxes 13 and 14, is the projection or stop 63 which may advantageously be formed on the back of plate 25. The stop 63, in this instance, is shown as projecting beyond the edge of plate 25 to an extent sufficient for it to contact the side face of one of the fingers 20a of the coupling box 14 when the coupling unit 12 is assembled and the valve member is shifted to port covering position. The stop 63 forms a positive means for preventing the valve member 15 from being shifted beyond the point of port covering position when it is desired to disassemble the coupling unit 12.

It will be understood that with the provision of the stop 63, the slotted opening 54 which coacts with the detent means 48 mounted in the coupling box 13 may be omitted. Inasmuch as the stop 63 serves to limit the movement of the plate 25 with respect to its coupling box 13, this function of the slotted opening 54 will be performed by the stop. It will be apparent that the stop 63 will permit the relative shifting of plate 25 in the coupling box 13 for the bleeding of the part by the use of bleed hole 56 in the manner previously described since the stop is spaced from the outer periphery of the body of the box 13 and its finger 21 by the width of the finger 20a when the parts are disassembled. The aligning or cam means 57a on plate 26 for alignment with opening 54 will, of course, be unnecessary if the slotted opening 54 in plate 25 is eliminated.

The complete combination of the aligning means detent, opening and stop may be employed as illustrated or one or the other of them may, if desired, be eliminated as indicated above.

A similar projection or stop 63 may advantageously be provided in a corresponding position on the plate 26 of valve member 15 to either supplement or displace the slotted opening 54a on plate 26 and its cooperating cam means 57 on plate 25. It will be understood further that the instrumentalities of the illustrated embodiment of the invention may take any of several other suitable forms.

Figures 10 and 11 illustrate a form of valve plate 62 for valve member 15, such as may be formed in a die casting operation, which corresponds generally to plate 25. It has the insert 30 formed integrally with said plate 62 to define the passageway 31 therethrough. The flanged portions 27b and 28b correspond to their counterparts on plate 25. The cam means 57b and 58b are also formed integrally with the plate 62 but instead of having arcuate surfaces, their surfaces may be stepped and yet will perform the same functions as those previously described.

The slotted opening 54b is shown in Figure 12 as having one extremity on the face of plate 62 disposed adjacent the face of the coupling box in which it is to be mounted tapered slightly to facilitate the engagement and disengagement of the end portion 52 of the shell 51 of a detent means 48 as the plate is shifted with respect to the supporting coupling box.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. A detachable coupling comprising a pair of ported coupling boxes each having supports thereon, a plurality of apertured members at least one of which is shiftably mounted in each support for covering and uncovering the port in said coupling box, said members having means thereon which mutually interfit and engage the supports of the other coupling box to lock said coupling boxes together when the ports in said boxes are uncovered and to disconnect said coupling boxes and disassemble said apertured members from each other when the ports in said boxes are covered; means on each of the coupling boxes which coacts with its respective apertured member to permit a restricted relative movement of said member with respect to its coupling box when the coupling boxes are uncoupled; and means associated with each of the coupling boxes for removing the restraint of the retaining means from the apertured member supported by the other coupling box when the boxes are placed in coupling relation.

2. In a coupling, a pair of ported coupling boxes each slidably supporting apertured slides for covering and uncovering the ports, means cooperating with the slides to couple the boxes together when the slides are moved to port uncovering position, retaining means in at least one of the coupling boxes which coacts with its slide to position said slide with respect to its coupling box when said boxes are coupled, means associated with the other coupling box for removing the restraint of the retaining means from the slide supported by the first mentioned coupling box, and means on at least one of said slides for preventing disengagement of the slide from its coupling box when the slide is shifted to port covering position but permitting limited relative movement therebetween.

3. A detachable coupling comprising a pair of ported coupling boxes each having supports thereon, a plurality of apertured members at least one of which is shiftably mounted in each support for covering and uncovering the port in said coupling box, said members having means thereon which mutually interfit and engage the supports of the other coupling box to lock said coupling boxes together when the ports in said boxes are uncovered and to disconnect said coupling boxes and disassemble said apertured members from each other when the ports in said boxes are covered, detent means in each coupling box, a slotted aperture in each of the apertured members for disengagably receiving the detent means to restrict the relative shifting of said apertured members with respect to the coupling boxes in which they are mounted when the boxes are disconnected, and a boss on each apertured member for registration with the slotted aperture on the other of said apertured members when the boxes and their associated apertured members are interfitted to connect them together.

4. A detachable coupling comprising a pair of ported coupling boxes, a slide shiftably supported in each coupling box for covering and uncovering the port therein, means on the coupling boxes cooperating with said slides to couple said boxes together when the slides are shifted to port uncovering position, a pair of apertures in one of said slides, a detent means in the coupling box supporting the apertured slide for engagement with one of the apertures for providing limited relative movement of the slide with respect to its box when the boxes are uncoupled, and means on the other slide for disengaging the detent means from the first mentioned aperture for engagement with the other aperture when the coupling boxes are assembled in coupled relation.

5. A detachable coupling comprising a pair of ported coupling boxes, a slide shiftably supported in each coupling box for covering and uncovering the port therein, means on the coupling boxes cooperating with said slides to couple said boxes together when the slides are shifted to port uncovering position, a pair of apertures in each of said slides, a detent means in each coupling box for engagement with one of the apertures in the slide supported by said coupling box for providing limited relative movement of the slide with respect to its box when the boxes are uncoupled, and means on each of said slides which registers with the apertures on the other of said slides when the coupling boxes are assembled in coupled relation for disengaging the detent means from each of the first-mentioned apertures for engagement with each of the remaining apertures when the slides are shifted to couple the boxes together.

6. In a detachable coupling having a pair of ported coupling boxes and a multi-part valve member shiftably supported by said coupling boxes for covering and uncovering said ports, one of said parts being supported in each box when the ports are covered and said boxes are uncoupled, restricting means comprising a detent means in each coupling box, an opening in each valve part for disengagably receiving the detent means of its coupling box for limiting the extent of relative movement between each valve part and its box when the boxes are uncoupled, and cam means on each valve part for camming the detent means out of engagement with the opening in the other valve part when the coupling boxes and their respective valve parts are assembled in coupling relation.

7. In a multi-part detachable coupling for establishing fluid flow communication between a pair of conduits, a shiftable member slidably mounted in each coupling part for alternately connecting the parts of said coupling together and sealing said parts against leakage of fluid therefrom when disconnected, said shiftable member comprising a pair of plates having a plurality of interfitting projections thereon, a portion defining a fluid passageway extending through said plates, restricting means defining limited relative movement of said plates with respect to their coupling parts when said parts are disconnected, and means for rendering said restricting means inoperative to prevent slidable movement of the shiftable member when the plates thereof are interfitted and the coupling parts are assembled for connection.

8. A detachable coupling for interconnecting a plurality of conduits for the flow of fluid therethrough comprising a pair of passaged coupling boxes, said coupling boxes having interlocking fingers thereon, a pair of plates slidably mounted between the interlocking fingers in the coupling boxes, said plates having interfitting flanged portions adjacent their contiguous faces to detachably connect said coupling boxes in fluid flow communication, said flanged portions on each plate coacting with the fingers on the coupling box associated therewith to retain the plates therein upon detachment of said coupling boxes, detent means on said coupling boxes, apertures in each of said plates for disengagably receiving the detent means, and cam means on each of said plates for disengaging said detent means from the apertures when the coupling boxes are connected together.

9. In a coupling, a pair of ported coupling boxes each shiftably supporting a valve member for covering and uncovering the ports, said valve members having bleed holes therethrough, means on said coupling boxes coacting with the valve members to couple the boxes together when said valve members are moved to port uncovering position, and means on each of the valve members coacting with the coupling box supporting the other valve member for stopping shifting movement of the valve members beyond port covering position and coacting with the coupling boxes in which the valve members are supported to permit additional limited movement of the valve members when the coupling boxes are separated to place the bleed holes of the valves in communication with the ports of the coupling boxes supporting the respective valves.

10. In a coupling, first and second ported coupling boxes, first and second valve members respectively shiftably mounted in said boxes to cover and uncover the ports of the boxes, said first valve having a bleed hole therein, and means on the first valve member coacting with the second box to stop shifting of the valve member when the boxes are together before the bleed hole registers with the ports of the boxes and said means also coacting with the first box when the boxes are apart to provide for additional limited movement of the valve member in the first box to place the bleed hole in registration with the port of said first box.

11. A coupling comprising a pair of ported coupling boxes, a valve member shiftable in each coupling box, cooperating means on said coupling boxes and valve members for connection and disconnection of the coupling boxes, means on a coupling box coacting with its associated valve member to permit limited relative movement between said member and said box when the coupling is disconnected, and said associated valve member having a bleeder aperture so positioned relative to said means as to selectively open the port of said box upon said limited movement in one direction.

JACOB RUSH SNYDER.
JAMES FREDERICK NORTON.